US007104740B2

(12) United States Patent
Girardin

(10) Patent No.: US 7,104,740 B2
(45) Date of Patent: Sep. 12, 2006

(54) WHEELCHAIR DOCKING SYSTEM

(75) Inventor: Jean-Marc Girardin, Golden Beach, FL (US)

(73) Assignee: Valeda Company LLC, Ft. Lauderdale, FL (US)

( * ) Notice: Subject to any disclaimer, the term of this patent is extended or adjusted under 35 U.S.C. 154(b) by 0 days.

(21) Appl. No.: 10/808,407

(22) Filed: Mar. 25, 2004

(65) Prior Publication Data

US 2005/0214089 A1 Sep. 29, 2005

(51) Int. Cl.
*B60P 3/08* (2006.01)

(52) U.S. Cl. .......................................................... 410/7

(58) Field of Classification Search .................... 410/2, 410/3, 4, 7, 77, 80; 296/65.04
See application file for complete search history.

(56) References Cited

U.S. PATENT DOCUMENTS 4,457,551 A * 7/1984 Anthony .................. 296/65.04
4,623,289 A 11/1986 Apostolos
4,671,713 A * 6/1987 Lenkman ....................... 410/7
4,690,364 A 9/1987 Constantin
4,754,946 A * 7/1988 Constantin ............... 248/503.1
4,805,954 A 2/1989 Lazaroff
5,628,595 A 5/1997 Harris
5,794,908 A * 8/1998 East et al. ............... 248/503.1
6,352,396 B1 * 3/2002 Budd et al. ..................... 410/8
6,474,916 B1 11/2002 Constantin
2002/0064433 A1 5/2002 Constantin
2003/0012617 A1 1/2003 Constantin

* cited by examiner

*Primary Examiner*—Hilary Gutman
(74) *Attorney, Agent, or Firm*—David I. Roche; Baker & McKenzie LLP

(57) ABSTRACT

A docking system for securing a wheelchair into a vehicle in which a docking shoe is firmly attached to either the frame of the wheelchair or to the floor of the vehicle, or both. A firm anchor device, which may be a second docking shoe, is firmly attached to the other of the floor and wheelchair. A docking arm is mounted vertically in the anchor device and the wheelchair is positioned in the vehicle so that the docking shoe and the anchor device are vertically aligned one above the other so that the docking arm can be slidably and releasably locked into the docking shoe. Preferably, the docking shoe includes an electrically operated, spring loaded, release mechanism.

7 Claims, 7 Drawing Sheets

WHEELCHAIR DOCKING SYSTEM

FIELD OF INVENTION

This invention relates to a system for securing wheelchairs and the like into a transport vehicle.

BACKGROUND OF INVENTION

The welfare and safety of persons being transported in wheelchairs, three wheeled scooters, power bases and the like is of ever increasing concern and many jurisdictions have enacted stringent safety requirements for devices to secure the wheelchair into the transport vehicle and the occupant into the wheelchair. Numerous structures, most of which are reasonably effective, have been suggested in the prior art, but they frequently require the attachment of a plurality of straps or the like to one or more anchor points in the vehicle. After attachment the straps have to be tightened either by the wheelchair occupant or by an attendant. Frequently, the wheelchair occupant has neither the physical strength nor the manual dexterity to manipulate the necessary straps and the like. This means that the attendant, or vehicle driver must spend several minutes securing each wheelchair in his/her charge into the vehicle. There have been some attempts to provide self attachment devices in the past and attention is directed to U.S. Pat. Nos. 4,690,364 and 6,474,916 in which a locking mechanism is secured either beneath or to the rear of a wheelchair and releasably locked to a post similarly mounted, either under or behind the wheelchair, on the floor of the vehicle. While reasonably effective in certain circumstances, problems of automatic unlocking and twisting or rotation of the wheelchair about the vertical post still remain. Thus there is a need for an automatic wheelchair tie-down system that can, if desired, be operated automatically by the attendant from a central location, or that can be operated manually by either the wheelchair occupant or by the attendant.

OBJECT OF INVENTION

Thus, an object of the present invention is to provide a docking system for a wheelchair or the like in a vehicular conveyance that can be operated manually, or automatically from a central location, and in which a vertically oriented docking arm is either securely mounted beneath the seat of the wheelchair so that the free end can engage securely with a floor mounted docking shoe, or in which the vertical docking arm is either permanently or releasably mounted on the floor of the vehicle and is engagable with a docking shoe mounted securely on the wheelchair adjacent the underside of the seat thereof. Preferably, but not essentially, the docking shoe, whether it is on the floor or mounted beneath the wheelchair seat, or both, is provided with a power operated latch mechanism so as to secure and release the vertical docking arm. Conveniently, but not essentially, the vertical docking arm may include a power transmission cable to transmit power to a docking shoe secured beneath the seat of the wheelchair via complementary sliding contacts on the docking arm and the docking shoe.

BRIEF STATEMENT OF INVENTION

By one aspect of this invention there is provided a wheelchair docking system for releasably securing a wheelchair to the floor of a vehicular conveyance, comprising:

support frame means adapted for rigid attachment to said wheelchair; docking shoe means, adapted for rigid attachment to either one of said support frame and said floor;

anchor means, adapted for rigid attachment to the other of said support frame and said floor; and arm means adapted, when in operative position, for rigid mounting in a vertical plane on said anchor means and adapted for sliding and locking engagement in said docking shoe means.

By another aspect of this invention there is provided A method for securing a wheelchair to the floor of a vehicular conveyance, comprising:

rigidly attaching a support frame means to said wheelchair;

rigidly attaching a docking shoe means, to either one of said support frame and said floor;

rigidly attaching anchor means to the other of said support frame and said floor;

rigidly mounting arm means on said anchor means so that, when in operative position, said arm means lies in a substantially vertical plane; and moving said wheelchair on said floor so as to vertically align said docking shoe and said anchor means one above the other and so that said docking arm moves into sliding and locking engagement in said docking shoe means.

DETAILED DESCRIPTION OF PREFERRED EMBODIMENTS

Figure 1:
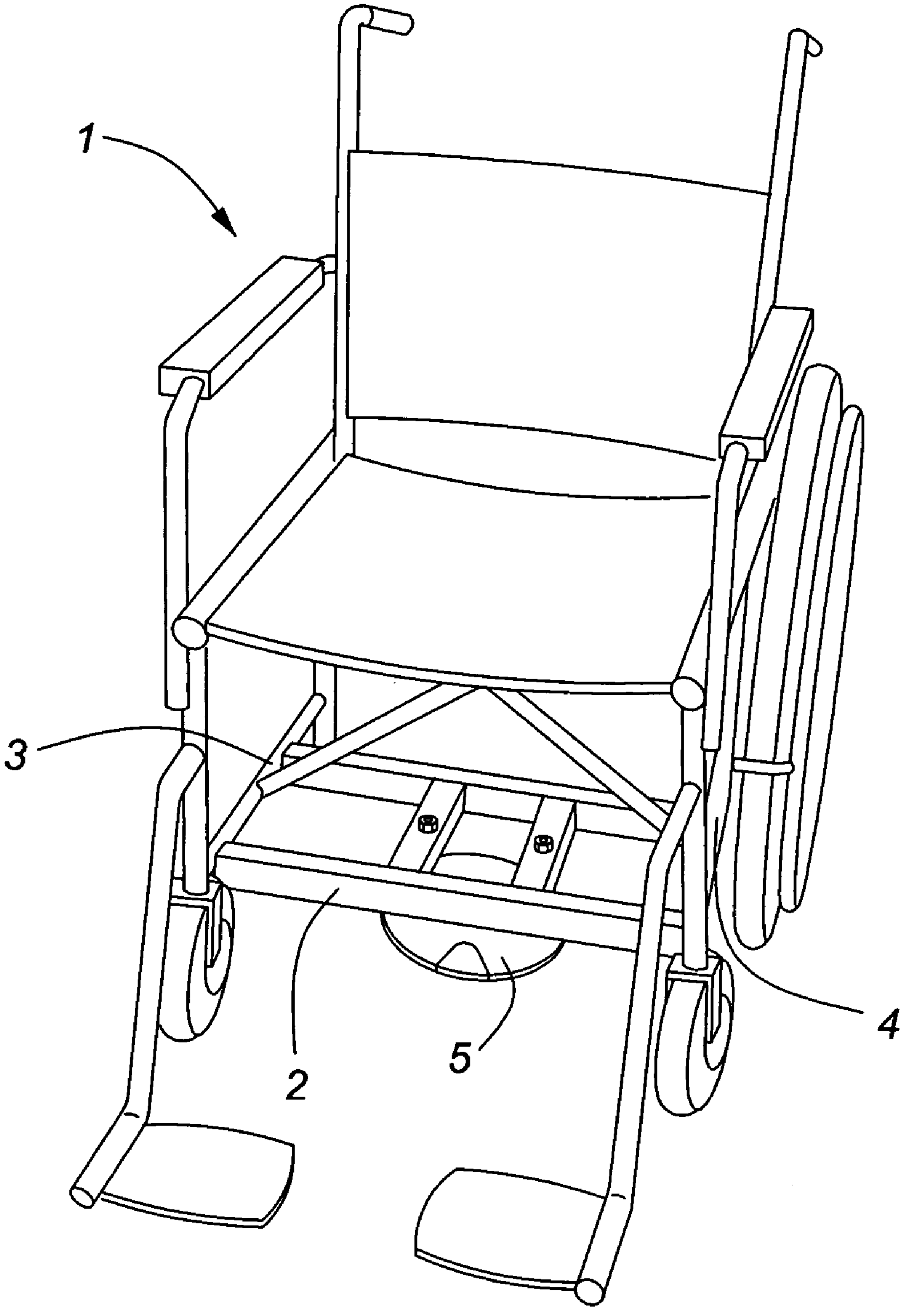
FIG. 1 is a front isometric view of one embodiment of a wheelchair according to the present invention.
Figure 2:
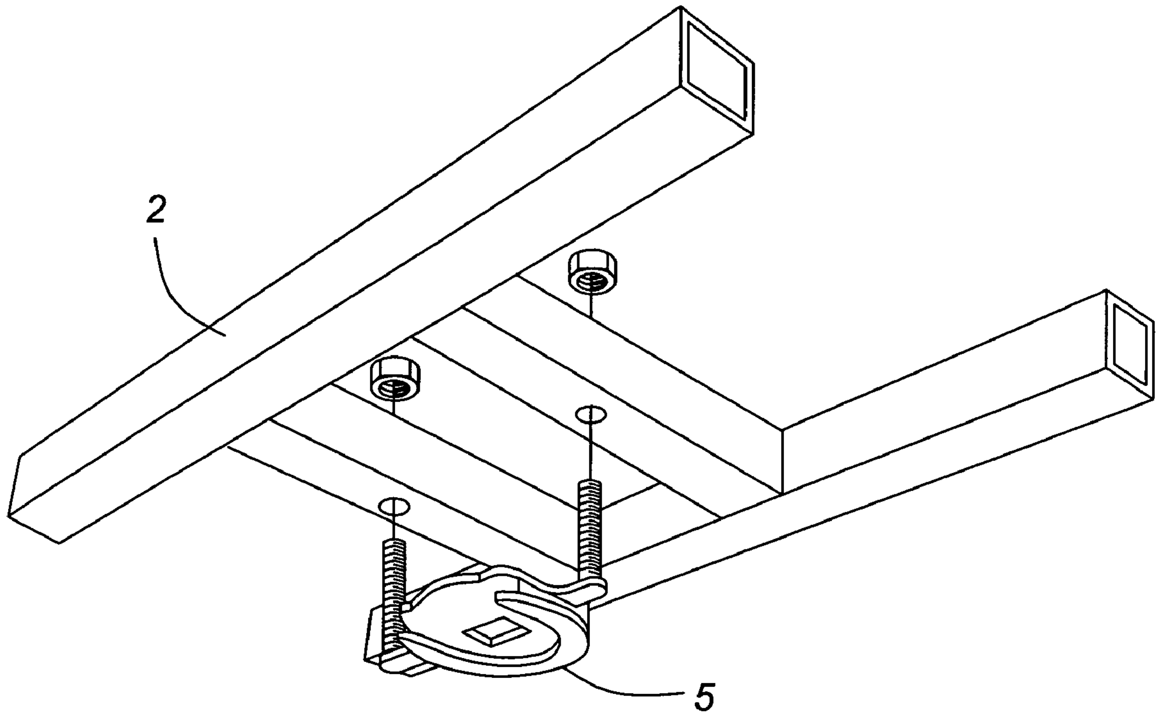
FIG. 2 is a close up view of the attachment frame mounted on the wheelchair of FIG. 1.
Figure 3:
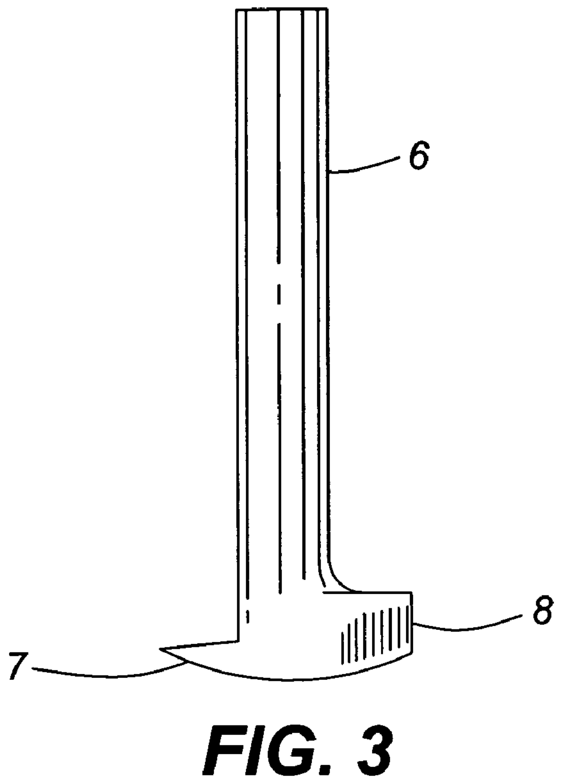
FIG. 3 is a side view of one embodiment of the docking arm of the present invention.

In FIG. 1 there is shown a wheelchair 1 having a quadrilateral frame 2 securely mounted to the side frame members 3,4 of the wheelchair 1. Frame 2 supports a central post mount 5 (as seen more clearly in FIG. 2). A docking arm 6 (seen most clearly in FIG. 3) is securely mounted in post mount 5 in any conventional manner such as screwing or clamping. Arm 6 is provided with a hammer headed like foot having a sloping leading edge 7 and a squared trailing face 8 and is of sufficient length to provide normal ground clearance but to engage a floor docking shoe 9 which is securely bolted, at any selected position on the floor of a vehicular conveyance (not shown), by means of bolts 16. Shoe 9 is provided with a flared and sloped entry 10 at one end thereof for sliding engagement with the leading edge 7 of arm 6 when the wheelchair is positioned thereabove. Edge 7 then rides over a spring loaded wedge shaped member 11 thereby compressing spring 12 (FIG. 5) and allowing the arm to fully enter the shoe 9 until the front 13 thereof abuts the face of the docking shoe 9, as seen in FIG. 6, whereupon the arm 6 clears wedge member 11 and allows spring 12 to extend and drive wedge 11 upwardly so that the vertical face 14 thereof abuts the rear face 8 of arm 6, thereby locking the arm and shoe together and securely fastening the wheelchair in the vehicle without any possibility of the wheelchair swivelling or twisting about the central axis thereof and without any need to tighten or adjust restraining straps and the like by either the wheelchair occupant or the attendant.

Figure 5:
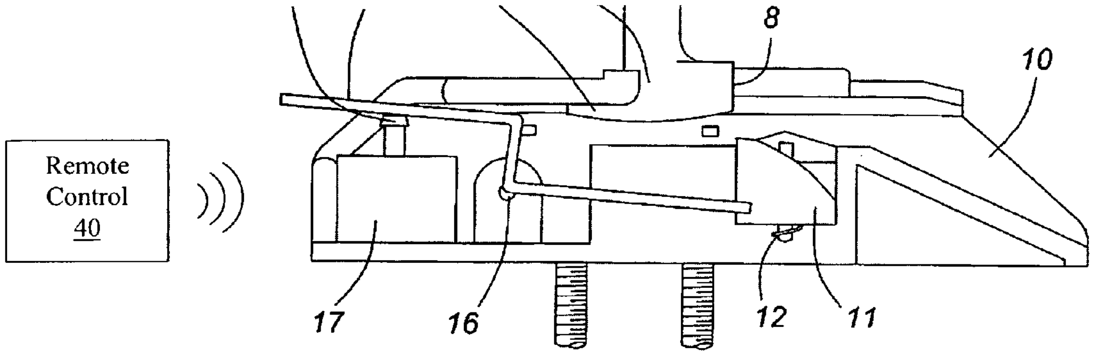
FIG. 5 is a side sectional view of the docking shoe of FIG. 4, in the loading or release position.
Figure 6:
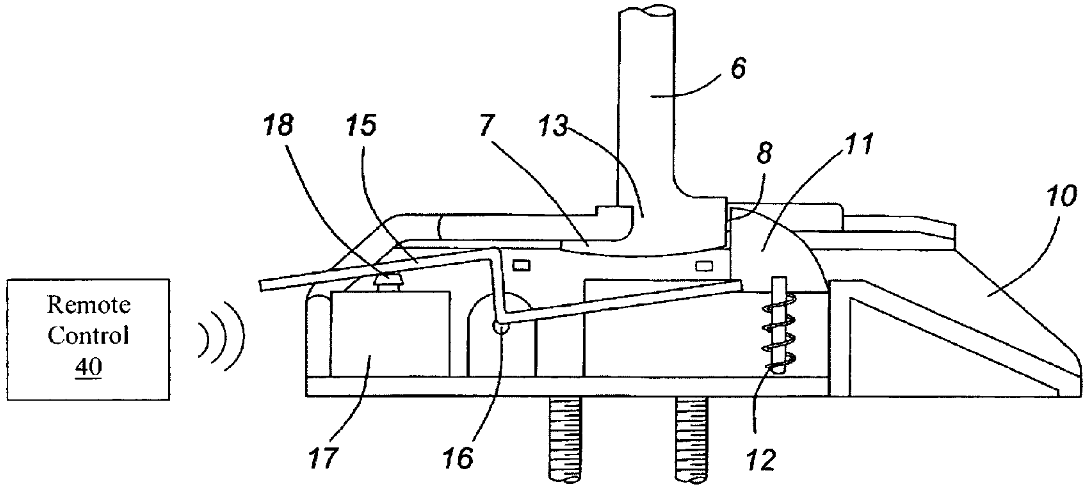
FIG. 6 is a side sectional view of the docking shoe of FIG. 4 in the locked position.

In order to release the wheelchair from the locked position it is merely necessary to raise the free end of the lever 15, pivotally mounted about a fulcrum 16 and engaging with wedge 11, from the locked position shown in FIG. 6 to the unlocked position shown in FIG. 5. This may be accomplished manually if necessary but it will be appreciated that this is impossible for a wheelchair occupant and somewhat awkward and inconvenient for the attendant. It is preferred, therefore, that the release be effected by the attendant from a central location such as the driver's seat. To facilitate release, a conventional solenoid switch 17 is mounted beneath end of lever 15 with the end of plunger 18 thereof in contact with lever 15. Upon activation of solenoid 17, plunger 18 extends from the retracted position shown in FIG. 6 to the extended position shown in FIG. 5, thereby forcing wedge 11 down to the unlocked position shown in FIG. 5 and releasing arm 6. Power for solenoid 17 may be provided in any conventional manner such as wires from the control position and the vehicle battery, or from an internal power source which may be actuated by any conventional remote control system 40 such as a radio signal.

It will be appreciated that the floor docking shoe 9 may equally well be mounted on the quadrilateral frame 2 on wheelchair 1 and the post mount 5 and arm 6 may be mounted on the floor of the vehicle. This arrangement has the advantage that the arm 6 is in the vehicle at a fixed position and this facilitates accurate location of a plurality of wheelchairs in the vehicle. It also allows for somewhat greater ground clearance for the wheelchair when it is not in the vehicle. Power to actuate solenoid 17, now located on wheelchair 1, may be provided from the wheelchair power supply if so equipped, an internal power supply or by leads passing internally through arm 6 and contact shoes (not shown) on docking shoe 9.

Figure 7:
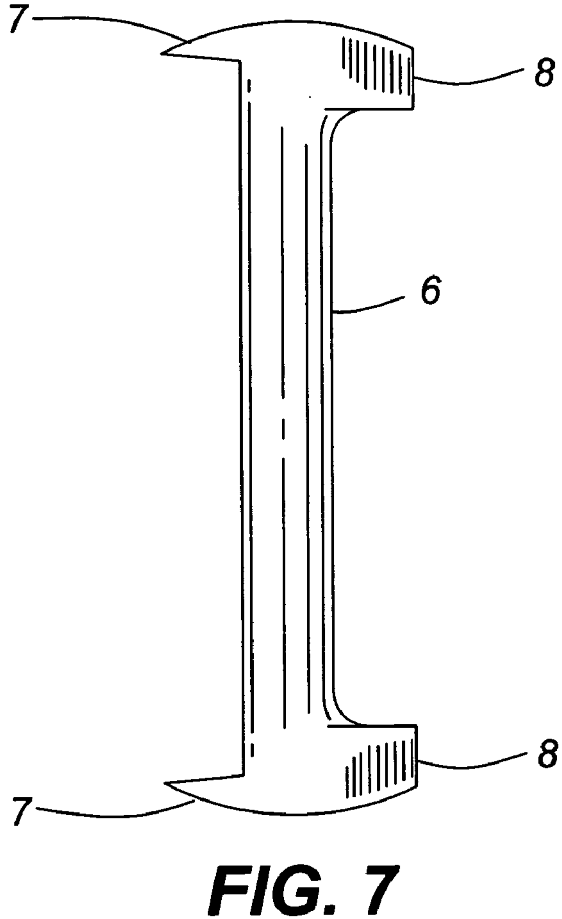
FIG. 7 is a side view of an alternative embodiment of the docking arm of the present invention.
Figure 4:
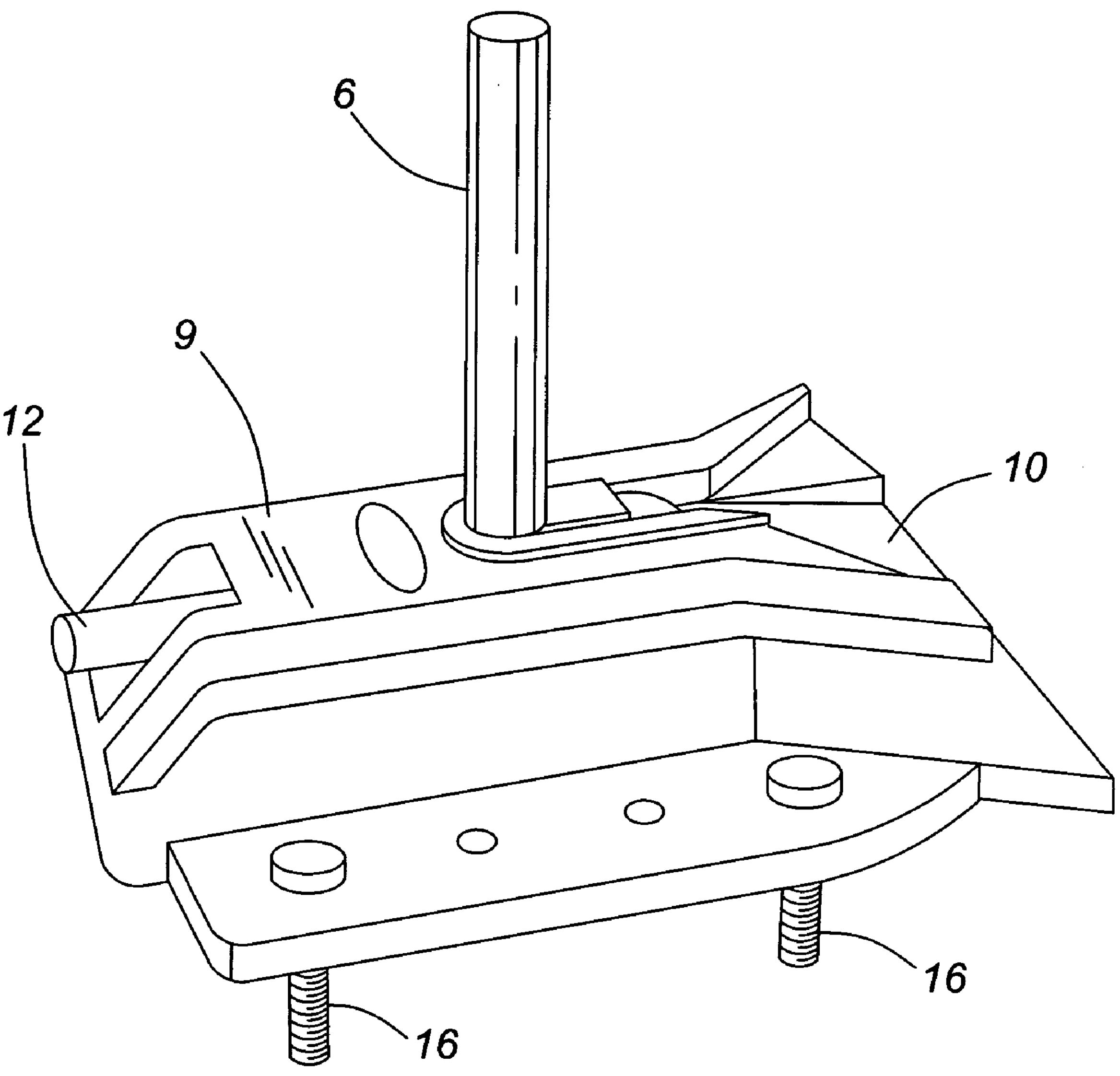
FIG. 4 is an isometric view of a floor mounted docking shoe according to one embodiment of the present invention.

In a third embodiment, docking shoes 9 may be provided on both the floor of the vehicle and on the quadrilateral frame on the wheelchair so as to provide for maximum ground clearance for the wheelchair and an uncluttered floor in the vehicle. In this embodiment it is, of course, necessary to modify the arm 6 to provide a sloped leading edge 7 and a squared trailing face 8 at each end thereof, as seen in FIG. 7, so that the arm 6 can be detached from both the wheelchair and the floor.

Figure 8:
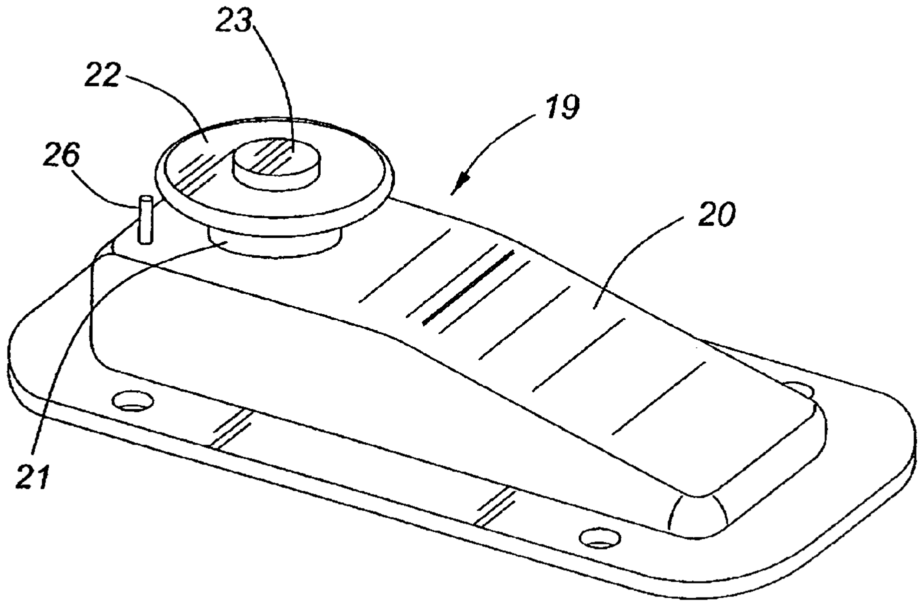
FIG. 8 is a perspective view of an alternative embodiment of a docking shoe, shown mounted on the floor.
Figure 9:
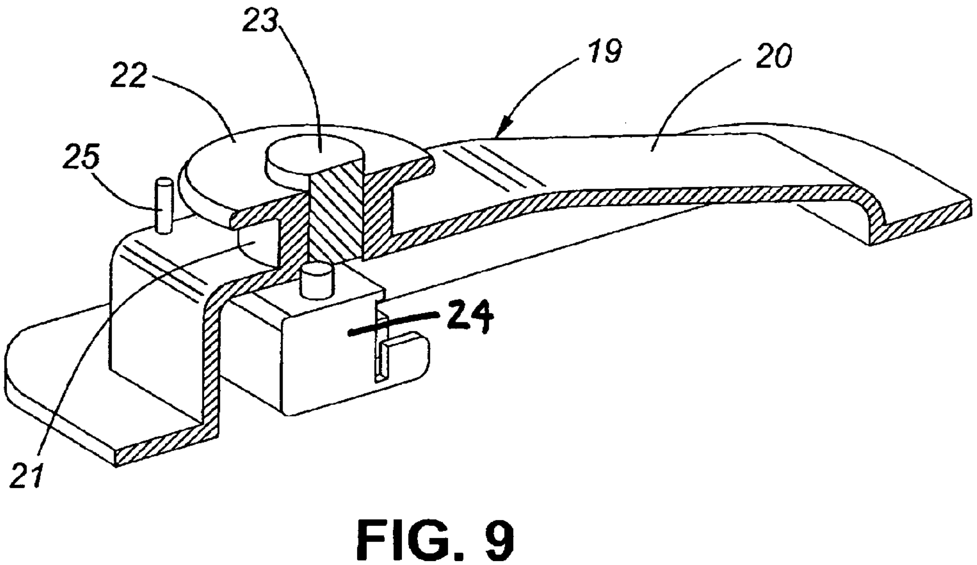
FIG. 9 is a sectional side view of the docking shoe of FIG. 8.
Figure 10:
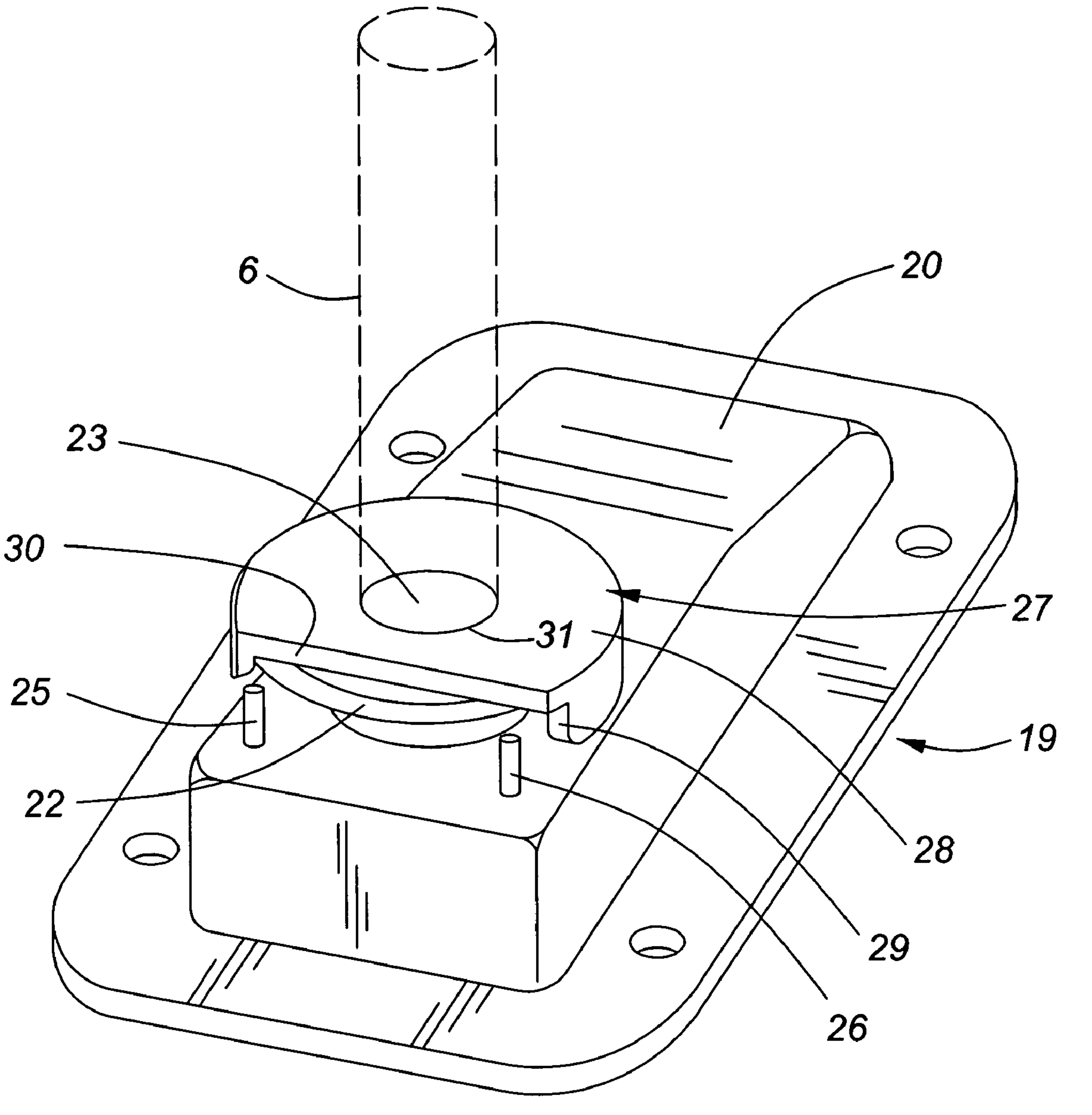
FIG. 10 is an end view of the docking shoe of FIG. 8.

It will be appreciated that many modifications may be made without departing from the spirit and scope of the present invention. For example, numerous variations of the docking shoe are possible and one such variation is illustrated in FIGS. 8 and 9, which show a docking shoe 19, having a flared and sloped entry ramp 20, similar to entry 10, which may be secured to the floor of the vehicle or to the wheelchair as described above. A circular pin 21, having a circular flange 22, is mounted vertically on shoe 19 and is provided with an axial, spring loaded, locking pin 23, which may be electrically actuated from a central location by the driver or by the wheelchair occupant, by a solenoid switch 24. Vertical locator pins 25,26 may also be mounted on shoe 19 and positioned so as to permit limited rotation of arm 6 or to prevent any rotation of arm 6, as described in more detail below. In order to cooperate with the modified shoe 19, the end of arm 6 must similarly be modified to provide a part-circular button 27 having a top 28 secured to arm 6 and a lower flange 29, the top surface of which is adapted to slidably engage the lower surface of flange 22 (as seen in FIG. 10). When fully engaged, spring loaded pin 23 extends through the axial bore 31 so as to releasably lock button 27 and arm 6 to the docking shoe 19. It will be appreciated that the position of pins 25,26 is a matter of choice so as to either permit limited rotation of arm 6 and hence of the wheelchair, or to preclude angular rotation when pins 25,26 abut flat face 30 of button 27. In order to release the wheelchair, the pin 23 is retracted by actuation of solenoid switch 24, either by the wheelchair occupant or by the attendant. In order to facilitate smooth mating of button 27 with flange 22, the edge 30 of button 27 and the circumferential rim of flange 22 are preferably bevelled.

It will, of course, also be appreciated that the docking shoe 19 may equally well be mounted on the wheelchair and the arm 6 mounted on the floor, as previously described with reference to the previous embodiment. Or, docking shoe 19 may be provided on both the floor and the wheelchair and a double-ended arm 6 having a button 27 at each end thereof, similar to FIG. 7 may be provided.

I claim:

1. A wheelchair docking system for releasably securing a wheelchair to the floor of a vehicular conveyance, comprising: a male docking member adapted for rigid attachment to said wheelchair; a female docking member adapted for rigid attachment to the floor of the conveyance; the female docking member having a moveable latch adapted for engagement with the male docking member, the latch being moveable between a first position and a second position, the first position being one in which the male docking member is restricted from being removed from the female docking member along the path by which the male docking member became engaged with the female docking member, the second position being one in which the male docking member is free to move along the path by which the male docking member became engaged with the female docking member, the male docking member having lower sides that engage complementary side walls within the female docking member to substantially restrict rotational movement of the male docking member relative to the female docking member when the latch is in the first position.

2. A wheelchair docking system as claimed in claim 1, wherein the latch is spring loaded, a spring tending to push the latch into the first position, and the latch being adapted to be moved from the first position to the second position by remote control.

3. A wheelchair docking system as claimed in claim 1 including a pivotally mounted and manually operable lever, operatively connected to the latch, the lever adapted to move the latch from the first position the second position.

4. A wheelchair docking system as claimed in claim 2 wherein said remote control includes an electrically operated solenoid switch adapted to move the latch from the first position the second position.

5. A wheelchair docking system for releasably securing a wheelchair to the floor of a vehicular conveyance, comprising: a male docking member adapted for rigid attachment to said wheelchair, a female docking member adapted for rigid attachment to the floor of the conveyance; the female docking member having a moveable latch adapted for engagement with the male docking member, the latch being moveable between a first position and a second position, the first position being one in which the male docking member is restricted from being removed from the female docking member along the path by which the male docking member became engaged with the female docking member, the second position being one in which the male docking member is free to move along the path by which the male docking member became engaged with the female docking member, the male docking member having lower sides that engage complementary side walls within the female docking member to substantially restrict rotational movement of the male docking member relative to the female docking member when the latch is in the first position, the latch being spring loaded with a spring tending to push the latch into the first position, and the latch being adapted to be moved from the first position to the second position by remote control.

6. A wheelchair docking system as claimed in claim 5 including a pivotally mounted and manually operable lever, operatively connected to the latch, the lever adapted to move the latch from the first position the second position.

7. A wheelchair docking system as claimed in claim 5 wherein said remote control includes an electrically operated solenoid switch adapted to move the latch from the first position the second position.

* * * * *